US009836403B2

(12) United States Patent
Johar et al.

(10) Patent No.: US 9,836,403 B2
(45) Date of Patent: Dec. 5, 2017

(54) DYNAMIC CACHE ALLOCATION POLICY ADAPTATION IN A DATA PROCESSING APPARATUS

(71) Applicant: ARM LIMITED, Cambridge (GB)

(72) Inventors: Kauser Johar, Cambridge (GB); Antony John Penton, Cambridge (GB); Zemian Hughes, Cambridge (GB)

(73) Assignee: ARM Limited, Cambridge (GB)

( * ) Notice: Subject to any disclaimer, the term of this patent is extended or adjusted under 35 U.S.C. 154(b) by 191 days.

(21) Appl. No.: 14/702,049

(22) Filed: May 1, 2015

(65) Prior Publication Data

US 2015/0356019 A1 Dec. 10, 2015

(30) Foreign Application Priority Data

Jun. 5, 2014 (GB) .................................. 1409963.4

(51) Int. Cl.
*G06F 12/0871* (2016.01)
*G06F 12/0831* (2016.01)

(52) U.S. Cl.
CPC ...... *G06F 12/0871* (2013.01); *G06F 12/0831* (2013.01); *G06F 2212/6046* (2013.01); *G06F 2212/621* (2013.01)

(58) Field of Classification Search
None
See application file for complete search history.

(56) References Cited

U.S. PATENT DOCUMENTS

| 5,572,660 A * | 11/1996 | Jones ................... G06F 11/1076 714/6.12 |
| 6,823,428 B2 * | 11/2004 | Rodriguez ............ G06F 12/127 711/133 |
| 2007/0079070 A1 * | 4/2007 | Piry .................... G06F 12/0804 711/118 |
| 2009/0157954 A1 | 6/2009 | Chung et al. |
| 2013/0124802 A1 | 5/2013 | Glasco et al. |

FOREIGN PATENT DOCUMENTS

WO  WO 2014/158156  10/2014

OTHER PUBLICATIONS

Search Report for GB 1409963.4, dated Dec. 3, 2014, 3 pages.

* cited by examiner

*Primary Examiner* — Baboucarr Faal
(74) *Attorney, Agent, or Firm* — Nixon & Vanderhye P.C.

(57) ABSTRACT

A data processing apparatus and method of processing data are disclosed according to which a processor unit is configured to issue write access requests for memory which are buffered and handled by a memory access buffer. A cache unit is configured, in dependence on an allocation policy defined for the cache unit, to cache accessed data items. Memory transactions are constrained to be carried out so that all of a predetermined range of memory addresses within which one or more memory addresses specified by the buffered write access requests lie must be written by the corresponding write operation. If the buffered write access requests do not comprise all memory addresses within at least two predetermined ranges of memory addresses, and the cache unit is configured to operate with a no-write allocate policy, the data processing apparatus is configured to cause the cache unit to subsequently operate with a write allocate policy.

19 Claims, 6 Drawing Sheets

DYNAMIC CACHE ALLOCATION POLICY ADAPTATION IN A DATA PROCESSING APPARATUS

This application claims priority to GB Patent Application No. 1409963.4 filed 5 Jun. 2014, the entire contents of which is hereby incorporated by reference.

TECHNICAL FIELD

The present disclosure relates to a data processing apparatus. More particularly, the present disclosure relates to the adaptation of the use of a cache unit within the data processing apparatus.

BACKGROUND

A cache unit may be provided in association with a processor unit in a data processing apparatus, wherein the cache unit is configured to store local copies of data items accessed in a memory by the processor unit, so that if access to those data items is required again, the latency associated with accessing the data items stored in the memory can largely be avoided by instead accessing the local copy stored in the cache. When such later access to a cached data item is made and when this access is a write access that copy may then be updated in the cache and marked as such ("dirty") in a write-back configuration, or the system may have a write-through configuration in which changes to data items in the cache are immediately propagated through to the original storage location in the memory.

In this context, the cache unit may have an allocation policy which determines its behaviour when a write miss occurs, i.e. when the processor unit seeks to write a data item to memory which is not currently cached in the cache unit. For example, in a data processing apparatus in which the reliability of the storage of data items is a significant factor, a "no-write allocate" policy may be used, according to which when a write miss occurs, the data item is caused to be written into the target memory without a copy of that data item also being pulled into the cache. Moreover, such a cache allocation policy may additionally be preferred because populating the cache with the data item will typically involve retrieving an entire cache line from the memory and it may be determined to be preferable to avoid the additional bus activity associated therewith.

SUMMARY

One example embodiment provides a data processing apparatus comprising a processor unit configured to issue a write access request which specifies a memory address and a data item in order to cause the data item to be stored in a memory at the memory address; a cache unit configured, in dependence on an allocation policy defined for the cache unit, to store a local copy of an accessed data item from the memory for subsequent access by the processor unit; and a memory access buffer configured to buffer one or more write access requests issued by the processor unit until a memory transaction trigger condition is satisfied and then to cause a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation, wherein the data processing apparatus is configured to identify an access undersize condition when the buffered write access requests do not comprise all memory addresses within at least two predetermined ranges of memory addresses, and when the cache unit is configured to operate with the allocation policy as a no-write allocate policy according to which the local copy of the accessed data item is not stored in the cache unit and the access undersize condition is met, the data processing apparatus is configured to cause the cache unit to subsequently operate with the allocation policy as a write allocate policy according to which the local copy of the accessed data item is stored in the cache unit.

Another example embodiment provides a method of data processing comprising the steps of issuing a write access request which specifies a memory address and a data item in order to cause the data item to be stored in a memory at the memory address; in dependence on an allocation policy, storing a local copy of an accessed data item from the memory for subsequent access; buffering one or more write access requests that have been issued until a memory transaction trigger condition is satisfied and then causing a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation; identifying an access undersize condition when the buffered write access requests do not comprise all memory addresses in at least two predetermined ranges of memory addresses; and when the allocation policy is a no-write allocate policy according to which the local copy of the accessed data item is not stored and the access undersize condition is met, causing the allocation policy to change to a write allocate policy according to which the local copy of the accessed data item is stored.

A further example embodiment provides a data processing apparatus comprising means for issuing a write access request which specifies a memory address and a data item in order to cause the data item to be stored in a memory at the memory address; means for storing, in dependence on an allocation policy, a local copy of an accessed data item from the memory for subsequent access; means for buffering one or more write access requests that have been issued by the means for issuing until a memory transaction trigger condition is satisfied and then causing a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation; means for identifying an access undersize condition when the buffered write access requests do not comprise all memory addresses in at least two predetermined ranges of memory addresses; and means for, when the allocation policy is a no-write allocate policy according to which the local copy of the accessed data item is not stored and the access undersize condition is met, causing the allocation policy to change to a write allocate policy according to which the local copy of the accessed data item is stored.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
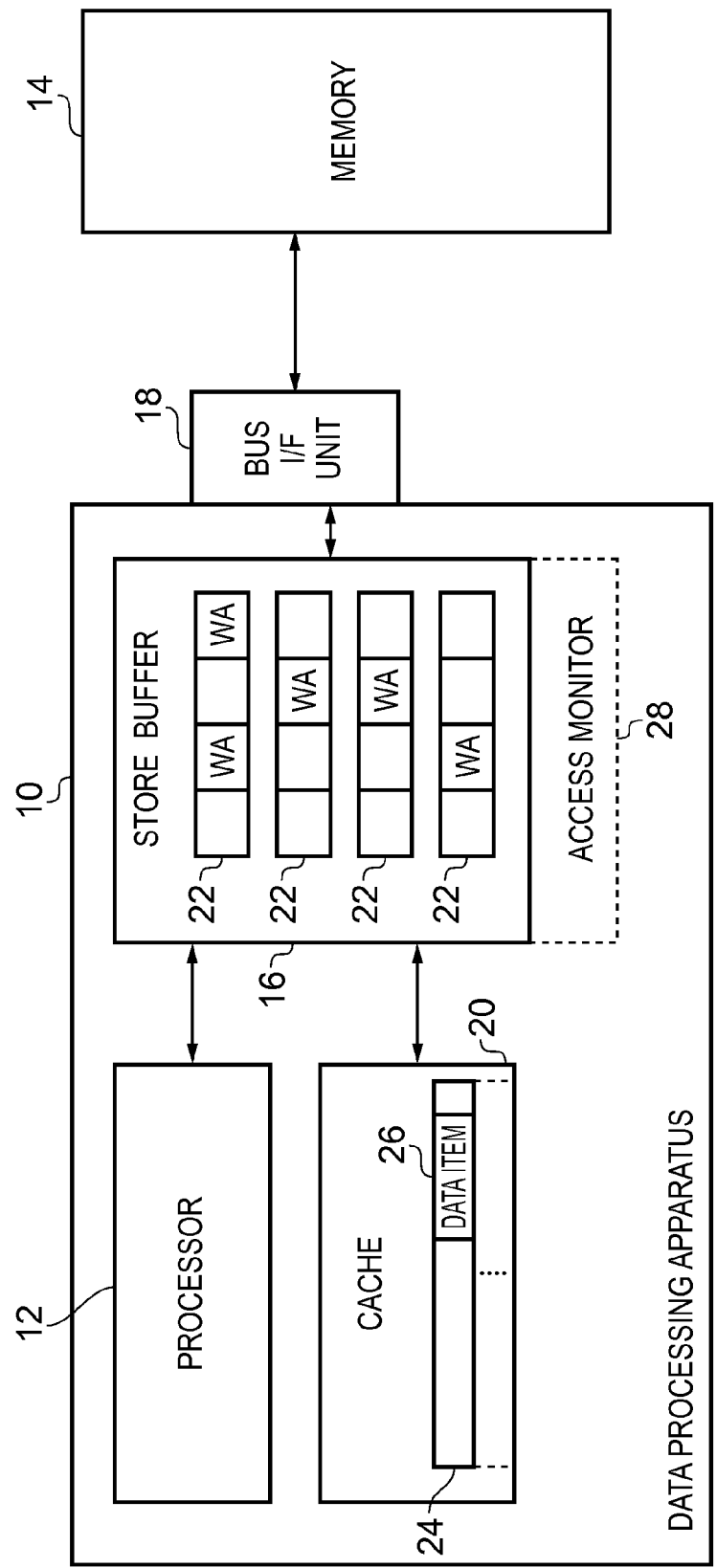
FIG. 1 schematically illustrates a data processing apparatus in one embodiment.

One example embodiment provides a data processing apparatus comprising a processor unit configured to issue a write access request which specifies a memory address and a data item in order to cause the data item to be stored in a memory at the memory address; a cache unit configured, in dependence on an allocation policy defined for the cache unit, to store a local copy of an accessed data item from the memory for subsequent access by the processor unit; and a memory access buffer configured to buffer one or more write access requests issued by the processor unit until a memory transaction trigger condition is satisfied and then to cause a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation, wherein the data processing apparatus is configured to identify an access undersize condition when the buffered write access requests do not comprise all memory addresses within at least two predetermined ranges of memory addresses, and when the cache unit is configured to operate with the allocation policy as a no-write allocate policy according to which the local copy of the accessed data item is not stored in the cache unit and the access undersize condition is met, the data processing apparatus is configured to cause the cache unit to subsequently operate with the allocation policy as a write allocate policy according to which the local copy of the accessed data item is stored in the cache unit.

It is recognised here that a no-write allocate policy for the cache unit may, under certain circumstances, not be the most desirable configuration for the operation of the cache unit. In particular, the inventors have identified that such a situation can occur when a memory transaction is to be carried out which comprises a write operation in which the constraint exists that where a memory address to be written to lies within a predetermined range of memory addresses, all memory addresses within that predetermined range must be written by the write operation. In other words, if a write access is made to any memory address within this predetermined range of memory addresses, then all memory addresses within that predetermined range must be written in the write operation. This kind of constraint on the memory transaction could exist for a number of different reasons. For example, it may be the case that the data items stored in the memory (which is the target of the memory transaction) have associated error correction codes stored with them, and the configuration of the error correction mechanism is such that the stored error correction codes each relate to a number of data items having a range of associated memory addresses. As such, if any data item within that grouping is to be updated (by a write access) then the entire group needs to be re-written, in order for the error correction code stored in association with the group to be correctly updated. As another example, this constraint on the memory transaction might result from the hardware configuration of the memory itself, which only allows groups of data items to be written together as a block, even though individual data items within such a block have their own individual memory addresses.

According to the present techniques, the data processing apparatus is provided with a memory access buffer which temporarily holds (buffers) write access requests issued by the processor unit before these one or more write access requests are then actioned by means of a memory transaction. This memory transaction is triggered by one or more predetermined condition being met (a memory transaction trigger condition), which could for example be a timeout or the buffer reaching its full capacity. This buffering provides the opportunity for multiple write access requests to combine and, in combination, to specify all memory addresses within a predetermined range of memory addresses, even if each individual write access request does not itself cover that whole range. In this context, the inventors of the present invention have established that when the write access requests buffered by the memory access buffer do not comprise all memory addresses within at least two predetermined ranges of memory addresses (referred to here as an access undersize condition), this represents a situation in which it may be beneficial to adapt the allocation policy of the cache unit. In particular, when the cache unit is currently operating in accordance with a no-write allocate policy according to which caching of data items accessed in the memory does not occur and the access undersize condition is met, then according to the present techniques the data processing apparatus causes the cache unit to subsequently operate using a write allocate policy according to which accessed data items are cached in the cache unit.

Accordingly, in the situation where the memory transaction comprises write access requests which seek to perform a write operation to only part of more than one predetermined range of memory addresses, if the cache unit is currently operating with a cache allocation policy which defines that local copies of accessed data items are not stored in the cache unit (a no-write allocate policy), then the data processing apparatus is configured to switch the cache allocation policy to a write allocate policy according to which local copies of accessed data items are stored in the cache unit. Such an arrangement has been determined to be beneficial despite the fact that allocation to the cache (by means of a line-fill operation) to implement the write allocation policy can generally result in additional burden on the system bus which mediates the memory transactions. However, it has been found that when the access undersize condition is met the benefit of caching the related data items can be gained without significantly further increasing the burden on the system bus, due to the bus transactions which must already be carried out in order to implement the read (due to the access undersize condition) and write operations to the more than one predetermined range of memory addresses specified.

In some embodiments the cache unit is configured to operate in a write-through mode according to which modification of the local copy of the accessed data item by the subsequent access also causes modification of the corresponding original data item in memory. A write-through configuration of the cache unit may be preferred because of the manner in which this keeps the data in the memory up-to-date (i.e. "dirty" data is not maintained in the cache, as in the case of a write-back configuration). The present techniques may find particular application in the context of a cache unit configured to operate in a write-through mode, because in this configuration the reliance on the usage of the cache is generally reduced and where additional cache allocation can be achieved without significant extra bus transaction costs, this is then particularly worthwhile.

In some embodiments the memory access buffer is configured, when the one or more buffered write access requests for which the memory access transaction is to be carried out specify memory addresses in at least one predetermined range of memory addresses which do not comprise all memory addresses within the at least one predetermined range of memory addresses, to cause the memory access transaction to comprise retrieving at least one extended data item indicated by the at least one predetermined range of memory addresses, causing the one or more data items specified in the buffered write access requests to be merged into the retrieved at least one extended data item, and writing the modified at least one extended data item back to the memory.

Accordingly, due to the fact that the memory transaction is constrained to carry out the write operation in a manner in which all memory addresses within the predetermined range of memory addresses are written by the write operation, when the buffered write access requests specify only part of a given predetermined range of memory addresses, the memory transaction request can be carried out as a read-modify-write operation. This read-modify-write operation comprises reading the "full" data item specified by the predetermined range of memory addresses from the memory, modifying that portion of it to which the write access requests are related (by merging the one or more data items specified in the buffered write access request into that "full" data item), and writing the thus-modified "full" data item back to the memory. In such an embodiment the fact that the buffered write access requests result in a memory access transaction which comprises a read operation, in particular a read operation which retrieves data corresponding to all of the predetermined range of memory addresses, means that when the access undersize condition is met (i.e. when at least two predetermined ranges of memory addresses should be partially written by the buffered write access requests) the cache allocation may take place (i.e. populating the cache with data items corresponding to the extended data items retrieved, without this allocation causing significant additional buffer access transactions to be carried out, since much (or all) of the required data for the line-fill operation is already being retrieved from memory.

In some embodiments, the data processing apparatus is configured, after causing the cache unit to subsequently operate with the allocation policy as the write allocate policy, and when the memory transaction trigger condition is satisfied, to identify an access full-size condition when the buffered write access requests for which a memory access transaction is to be carried out specify memory addresses which comprise all memory addresses in at least one predetermined range of memory addresses within which the specified memory addresses lie, and when the access full-size condition is met, the memory access buffer is configured to cause the cache unit to switch back to operation with the allocation policy as the no-write allocate policy.

It is thus recognised that, following the identification of the access undersize condition and the switching of the cache unit to operate according to the write allocate policy, it may be beneficial, under the right circumstances, to switch the cache unit back to operate according to the no-write allocation policy. Such circumstances are recognised here as being fulfilled when a memory access transaction needs to be carried out which specifies memory addresses which comprise all memory addresses in at least one predetermined ranges of memory addresses to which the specified memory addresses belong. In other words, this is when at least one of the predetermined ranges of memory addresses within the memory access transaction is "fully accessed" by the buffered write access requests, i.e. those buffered write access requests will write to all memory addresses within that predetermined range of memory addresses. This being the case, it is recognised that this memory transaction can be carried out in a relatively straightforward manner—for example a contiguous block of data can be written to the one or more predetermined ranges of memory addresses, requiring only a relatively simple bus transaction—and operating the cache unit in accordance with the write allocate policy would potentially incur additional bus transactions, such that overall the number of bus transactions may be reduced by switching the cache unit back to the no-write allocate policy.

In some embodiments, the cache unit is configured initially to operate with the allocation policy as the no-write allocate policy. It will be recognised that the cache unit could be configured in a number of different ways, these being either hardware or software specified, but the processing burden on the processor unit is reduced where the allocation policy according to which the cache unit operates is part of the hardware configuration. As such it may be beneficial to initially configure the cache unit, as part of such a hardware configuration, to operate with a no-write allocate policy.

The predetermined range of memory addresses which the memory transaction is constrained to write as a block may correspond to various different aspects of the manner in which data items are stored in the memory. However, in one embodiment data items are stored in the memory with associated error correction code and the predetermined range of memory addresses is determined by a unit data item size which must be read from the memory in order for the associated error correction code to be updated. Accordingly, in such an embodiment the error correction code may be generated with reference to data items stored at the predetermined range of memory addresses, such that if any data item within the predetermined range of memory addresses is updated then the associated error correction code for that whole block of data items needs updating as well.

The calculation of the corresponding error correction code may take place in a number of different ways in the data processing apparatus, for example, this may essentially be a feature of the memory itself or may be a feature of the data processing apparatus. In one embodiment the data processing apparatus further comprises an error correction code determination unit configured to determine updated error correction code values for inclusion in the memory transaction. Accordingly, when the buffered write access requests are to be carried out as a memory transaction, the error correction code determination unit can provide the corresponding error correction code values which can then be written to the memory in association with the data items specified in the buffered write access requests. In some embodiments the memory access buffer comprises the error correction code determination unit.

In some embodiments the predetermined range of memory addresses is determined by a unit data size for the memory transaction with respect to the memory. Accordingly, the constraint on the memory transaction to write to all memory addresses in the predetermined range of memory addresses may result from a feature of the memory itself, for example, the memory may be configured such that there is a minimum group of memory addresses which must be accessed together in a write transaction.

The memory access buffer may be configured in a variety of ways, but in one embodiment the memory access buffer comprises an access slot, wherein the access slot is configured to buffer write access requests issued by the processor unit with respect to a selected memory address stored in association with the access slot. The association of a particular memory address with the access slot thus enables the memory access buffer to accumulate write access requests which may usefully be carried out together in a single memory transaction by virtue of the close spatial correlation of the data items to which those write access requests relate. In other words the access slot stores a memory address and write access requests relating to that memory address (i.e. at that memory address or within an offset represented by the size of the slot from that memory address) can then be accumulated in that access slot before being carried out.

The size of the data items which the access slot can buffer for the write access requests may vary, but in one embodiment the access slot is configured to have a size which is less than the cache line size. In other words the size of the access slot may be such that the (maximum number of) buffered data items have a combined size which is less than the cache line size in the cache unit. It will be recognised that the cache line size in the cache unit typically represents the unit of data which the cache unit will cause to be retrieved from memory when a particular data item is to be cached in the cache unit (by means of a line fill operation). As such it is noted that, by comparison to the size of the access slot, a line fill operation for the cache unit represents a significant operation in terms of the bus transactions which must be carried out to support it and accordingly switching the cache unit to operate according to the write allocate policy could in principle result in significant additional bus transactions occurring. However in the context of the present techniques, where the data processing apparatus is configured to switch the cache unit to operate in accordance with the write allocate policy when the access undersize condition is met, such significant additional bus transaction burden does not result.

Whilst the memory access buffer may comprise only one access slot, in some embodiments the memory access buffer comprises multiple access slots, wherein each access slot is configured to buffer write access requests issued by the processor unit with respect to a selected memory address stored in association with that access slot. In other words, each access slot stores a memory address and write access requests relating to that memory address (i.e. at that memory address or within an offset represented by the size of the slot from that memory address) can then be accumulated in that access slot before being carried out.

The access undersize condition may be identified with respect to just one access slot, but in some embodiments the data processing apparatus is configured to identify the access undersize condition with respect to the multiple write access requests which are buffered in more than one access slot.

The data processing apparatus may be configured to identify the access undersize condition with respect to a single memory transaction or with respect to plural memory transactions. In one embodiment, the data processing apparatus is configured to identify the access undersize condition when the buffered write requests which do not comprise all memory addresses within at least two predetermined ranges of memory addresses are carried out in a single memory transaction.

In some embodiments the memory access buffer is configured to identify the access undersize condition when the buffered write requests which do not comprise all memory addresses within at least two predetermined ranges of memory addresses are carried out in separate memory transactions which are carried out at less than a predetermined separation from one another.

This predetermined separation could take a number of forms, for example being defined by a timing separation of the separate memory transactions or an ordinal separation in a sequence of memory transactions.

In one embodiment the separate memory transactions are carried out back-to-back with respect to one another. In other words these separate memory transactions are carried out without a further memory transaction being carried out between them.

The access undersize condition could be identified by a number of different components of the data processing apparatus and similarly the cache unit could be caused to change allocation policy in dependence on the access undersize condition by a number of different components of the data processing apparatus, but in one embodiment the memory access buffer is configured to identify the access undersize condition, and the memory access buffer is configured to cause the cache unit to change allocation policy in dependence on the access undersize condition.

Another example embodiment provides a method of data processing comprising the steps of: issuing a write access request which specifies a memory address and a data item in order to cause the data item to be stored in a memory at the memory address; in dependence on an allocation policy, storing a local copy of an accessed data item from the memory for subsequent access; buffering one or more write access requests that have been issued until a memory transaction trigger condition is satisfied and then causing a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation; identifying an access undersize condition when the buffered write access requests do not comprise all memory addresses in at least two predetermined ranges of memory addresses; and when the allocation policy is a no-write allocate policy according to which the local copy of the accessed data item is not stored and the access undersize condition is met, causing the allocation policy to change to a write allocate policy according to which the local copy of the accessed data item is stored.

A further example embodiment provides a data processing apparatus comprising means for issuing a write access request which specifies a memory address and a data item in order to cause the data item to be stored in a memory at the memory address; means for storing, in dependence on an allocation policy, a local copy of an accessed data item from the memory for subsequent access; means for buffering one or more write access requests that have been issued by the means for issuing until a memory transaction trigger condition is satisfied and then causing a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation; means for identifying an access undersize condition when the buffered write access requests do not comprise all memory addresses in at least two predetermined ranges of memory addresses; and means for, when the allocation policy is a no-write allocate policy according to which the local copy of the accessed data item is not stored and the access undersize condition is met, causing the allocation policy to change to a write allocate policy according to which the local copy of the accessed data item is stored.

FIG. 1 schematically illustrates a data processing apparatus 10 in one embodiment. A processor unit 12 in the data processing apparatus is configured to carry out data processing operations which include writing data items to specified memory addresses in a memory 14. The processor unit 12 causes a data item to be written to a specified memory address in the memory 14 by issuing a write access request specifying the memory address and the data item. Write access requests issued by the processor unit 12 are received by a store buffer 16. The store buffer 16 comprises a number of access slots 22 which temporarily buffer write access requests before they are carried out as a memory transaction. A memory transaction from the store buffer 16 proceeds via the bus interface unit 18, via the system bus (not illustrated) to the memory 14. The data processing apparatus also comprises a cache 20 which is configured to store local copies of data items which the processor unit is currently using as part of its data processing operations, such that the latency associated with retrieving these data items from the memory 14 can largely be avoided. Access to the content of cache 20 by the processor unit 12 is mediated by the store buffer 16, such that when a write access request issued by the processor 12 is received by the store buffer 16 a cache lookup is initiated to determine if the specified data item is currently stored in the cache. The cache 20 comprises a number of cache lines 24 and a data item 26 stored in the cache will typically only occupy a relatively small proportion of a given cache line 24.

The data processing apparatus 10 is configured such that, by default, the cache unit 20 operates with a no-write allocate policy, meaning that when the above-mentioned cache lookup takes place and a cache miss occurs, in response to a write access request received by the store buffer 16 from the processor 12, the data item is not caused to be stored in the cache 20, but is written directly to the memory 14. Although this means that if subsequent access to the same data item is made by the processor unit 12 it will not be available in the cache for faster access, a lesser burden is placed on the bus system because storing this data item in the cache would involve a line fill operation comprising retrieving an entire cache line's worth of data from the memory 14. Nevertheless, the data processing apparatus 10 according to the present techniques is configured to dynamically adapt its cache allocation policy in dependence on the nature of the write access requests received by the store buffer 16 from the processor unit 12. As will be described in more detail with reference to the following figures, these write access requests are monitored and under appropriate circumstances the cache allocation policy is switched to a write allocate policy according to which local copies of data items are stored in the cache unit. The monitoring of the write access requests received by the store buffer 16 could be implemented in a number of ways and is generically illustrated by the provision of the access monitor 28 shown in FIG. 1. This access monitor 28 is illustrated as being associated with the store buffer 16, but it should be recognised that this association is functional and the access monitor 28 could represent a separate component of the data processing apparatus 10, or as in the case of the embodiments described below with reference to FIG. 2, the access monitor 28 could itself be part of the store buffer 16.

Figure 2:
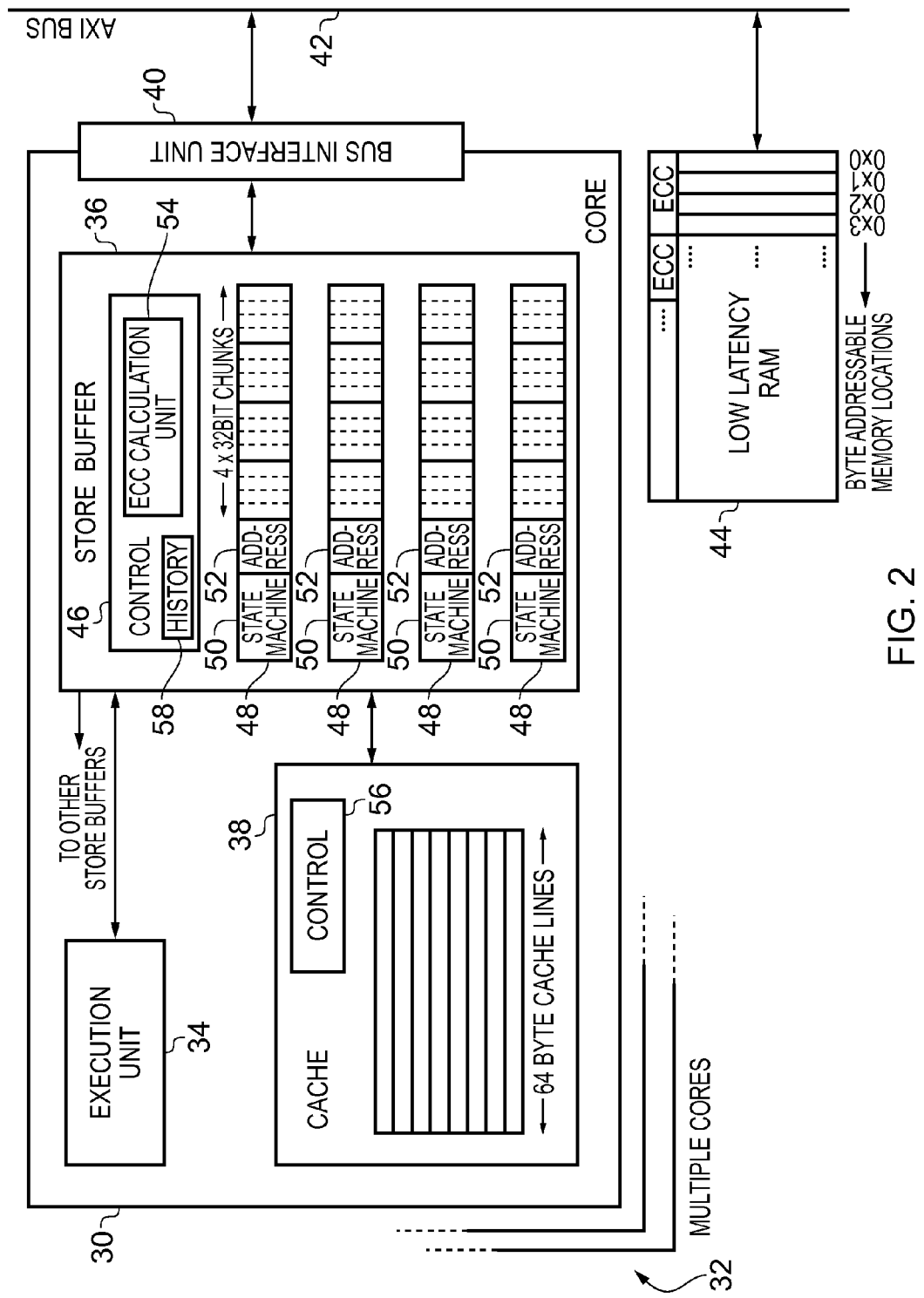
FIG. 2 schematically illustrates a data processing apparatus in one embodiment.

FIG. 2 schematically illustrates in more detail the configuration of a data processing apparatus in one embodiment. The data processing apparatus is represented in FIG. 2 by the core 30, which (as illustrated by the "multiple cores" 32), is one of several processor cores, each of which is configured in the same manner as core 30. Core 30 comprises execution unit 34, store buffer 36, cache 38 and (on its periphery) bus interface unit 40. As described above with reference to the embodiments shown in FIG. 1, the store buffer 36 in FIG. 2 is provided to administer the write access requests issued by the execution unit 34 when data items should be written to specified memory addresses. The bus interface unit 40 provides the interface between the core 30 and the system bus 42, which in this instance is an AXI bus as provided by ARM Limited of Cambridge UK. Also coupled to the system bus 42 is a memory 44 which in this instance is a low latency RAM provided in association with the core 30, and in which the data can be accessed relatively quickly (relative to other instances of memory in the system). Memory locations in the low latency RAM 44 are byte addressable i.e. the data is stored in the memory 44 with a granularity at the byte level, such that individual bytes of data can be addressed (and hence written or read) in the memory. In addition however, the memory 44 stores error correction code (ECC) in association with 32-bit chunks of data (i.e. blocks of 4 bytes). The storage of this ECC in association with the data provides a level of redundancy and hence protection for that data, such that if an error occurs in a stored data item (for example due to a particle strike) then as long as the error is not too extensive it can be detected and/or corrected for.

The storage of the ECC in association with the data in the memory 44 also has a consequence for the administration of the write access requests by the store buffer 36 in that a write access request received by the store buffer 36 from the execution unit 34 may specify as little as a single byte within the memory 44, yet the storage of the ECC in association with 4-byte (32-bit) "chunks" of data means that a write access request which specifies a sub-chunk (i.e. fewer than all 4 bytes in a 32-bit chunk) must nevertheless be implemented by a memory transaction which writes all of the 32-bit chunk, because the ECC must be determined with respect to the whole chunk.

Overall control of the store buffer 36 is maintained by the control unit 46. The store buffer 36 comprises 4 access slots 48, each of which is configured to operate on the basis of a state machine 50 and holds a specified address 52 for the write access requests allocated to that access slot. Each access slot can hold up to four 32-bit chunks of data. Write access requests received by the store buffer 36 from the execution units 34 are administered by the control unit 46, which allocates each received write access request to one of the access slots 48, in particular in dependence on the memory address associated with that write access request. Where a write access request is received which specifies a memory address which is already stored in one of the access slots, or at least the received address is within the range represented by the address stored in an access slot and the 128-bit (4×32-bit) data range which that access slot can hold, then the subsequent write access request can be accumulated into that access slot. If a write access request is received which specifies a memory address which is unrelated to the current content of any access slot, then the new write access request is allocated to a free access slot, or must be buffered until an access slot becomes free. Each access slot thus serves to accumulate write access requests relating to a 128-bit range of data (4 chunks). An access slot in the store buffer 36 continues to accumulate write access requests until a memory transaction trigger condition is satisfied, at which point the store buffer 36 causes the content of that access slot to be actioned as a memory transaction via the bus interface unit 40 and system bus 42 to access the memory 44. The control unit 46 also comprises ECC calculation unit 54 which is configured to calculate the error correction code (ECC) which is stored in the memory 44 in association with each 32-bit (4-byte) chunk of data. The storage of the ECC in association with each such chunk of data and in particular the fact that the ECC is determined with respect to a 32-bit chunk (as opposed to each individual byte) means that a write transaction which the store buffer carries out must be with respect to a full 32-bit chunk and cannot be carried out with respect to only a portion of a chunk (a "sub-chunk"). As a result, in a situation where the memory transaction trigger condition is satisfied and the content of an access slot is to be actioned as a memory transaction to write this content into the memory 44, if any of the four 32-bit chunks within that access slot are only partially specified (i.e. less than all 4 bytes in that chunk are specified to be written) then this memory transaction is carried out as a read-modify-write transaction, wherein the corresponding chunk is first read from the memory 44, the new sub chunk to be written is merged into the chunk which has been read from the memory, the new ECC is determined by the ECC calculation unit 54, and the full chunk with its associated updated ECC is then written to the memory 44. Conversely, if the content of an access slot is only full chunks of data when that access slot's content is to be written out as a memory transaction, then this memory transaction can be implemented as a direct write transaction according to which the specified chunks (with associated ECC calculated by unit 54) are written to the memory 44.

As part of its overall administration of the operation of the store buffer 36, the control unit 46 monitors the memory accesses being carried out (and thus takes the role of the access monitor 28 shown in FIG. 1). When a write access request is received from the execution unit 34, as well as the above-described administration of the use of the access slots 48, the control unit 46 causes a cache lookup to be performed in the cache 38 in order to determine if a data item specified in the write access request is currently stored in a cache line of the cache 38. The cache 38 comprises control unit 56 which controls the operation of the cache. If the data item is not currently stored in the cache 38 (a cache miss) then, by default, the core 30 is configured to write the specified data item to the memory 44 without populating a cache line of the cache 38 with this data. In other words, generally, the cache 38 is configured to operate in accordance with a no-write allocation policy. This configuration is generally preferred for the operation of the core 30 in association with the low latency RAM 44, because it avoids the additional bus transactions associated with performing a line fill operation to populate an entire 64-byte cache line which includes the specified data item. Reducing the number of bus transactions in this manner supports the use of a low latency (i.e. fast) RAM as a data storage location for the core 30, thus reducing the likelihood that the execution unit 34 will be stalled because of a queue of pending bus transactions.

The control unit 46 of the store buffer 36 is further configured to monitor the write access requests, and in particular the "occupancy" of the memory transactions which result from the accumulation of write access requests in a given access slot 48 of the store buffer 36. The control unit 46 is configured to identify the situation when a memory transaction takes place in which more than one sub-chunk data item is specified. In other words, if more than one of the four 32-bit chunks which may be specified in a given access slot in fact only specifies a portion of that chunk to be written, then the control unit 46 identifies this as an "access undersize condition". When the access undersize condition is identified by the control unit 46, it signals to the cache 38 (and in particular to the control unit 56 thereof) that if the cache unit is currently operating with a no-write allocate policy, then the cache unit should switch to operating with a write allocate policy. This configuration of the operation of the control unit 46 of the store buffer 36 has been determined to be worthwhile because although operating the cache with a write allocate policy means that linefill operations will additionally take place in order to populate the cache with the corresponding data items, when more than one sub-chunk write operation is carried out it has been found that the corresponding linefill operations are less burdensome than they might otherwise be. This is due to the fact that these sub-chunk write operations will be handled as read-modify-write operations by the store buffer 36 and in particular therefore that read transactions with respect to these data items are already being carried out and in this context the benefit of subsequently having these data items available in the cache 38 outweighs the additional burden of retrieving the remainder of the relevant cache line in order to populate these sub-chunk data items into the cache.

The control unit 46 of the store buffer 36 is configured not only to identify the more than one sub-chunk data item within a single access slot, but can also identify the access undersize condition when buffered write access requests in more than one access slot 48 specify sub-chunk data items. Because many transactions originating from different access slots may take place one after another, the control unit 46 is provided with a history storage 58 which is in particular configured to keep a record of the most recent memory transactions initiated by the store buffer 36 and whether those memory transactions for each access slot comprise at least one sub-chunk data item. The control unit 46 is thus configured to identify the access undersize condition when two transactions originating from two different access slots 48 take place wherein each comprises a sub-chunk data item and the memory transactions are back-to-back, i.e. not separated by a further memory transaction.

The store buffer 36 is additionally configured to communicate with the other store buffers of the further cores 32 in the data processing system, in order to maintain cache coherency between the cache units 38 provided in association with each core. This is in a manner with which one of ordinary skill in the art will be familiar and further detail of this communication is dispensed with here for brevity.

Figure 3:
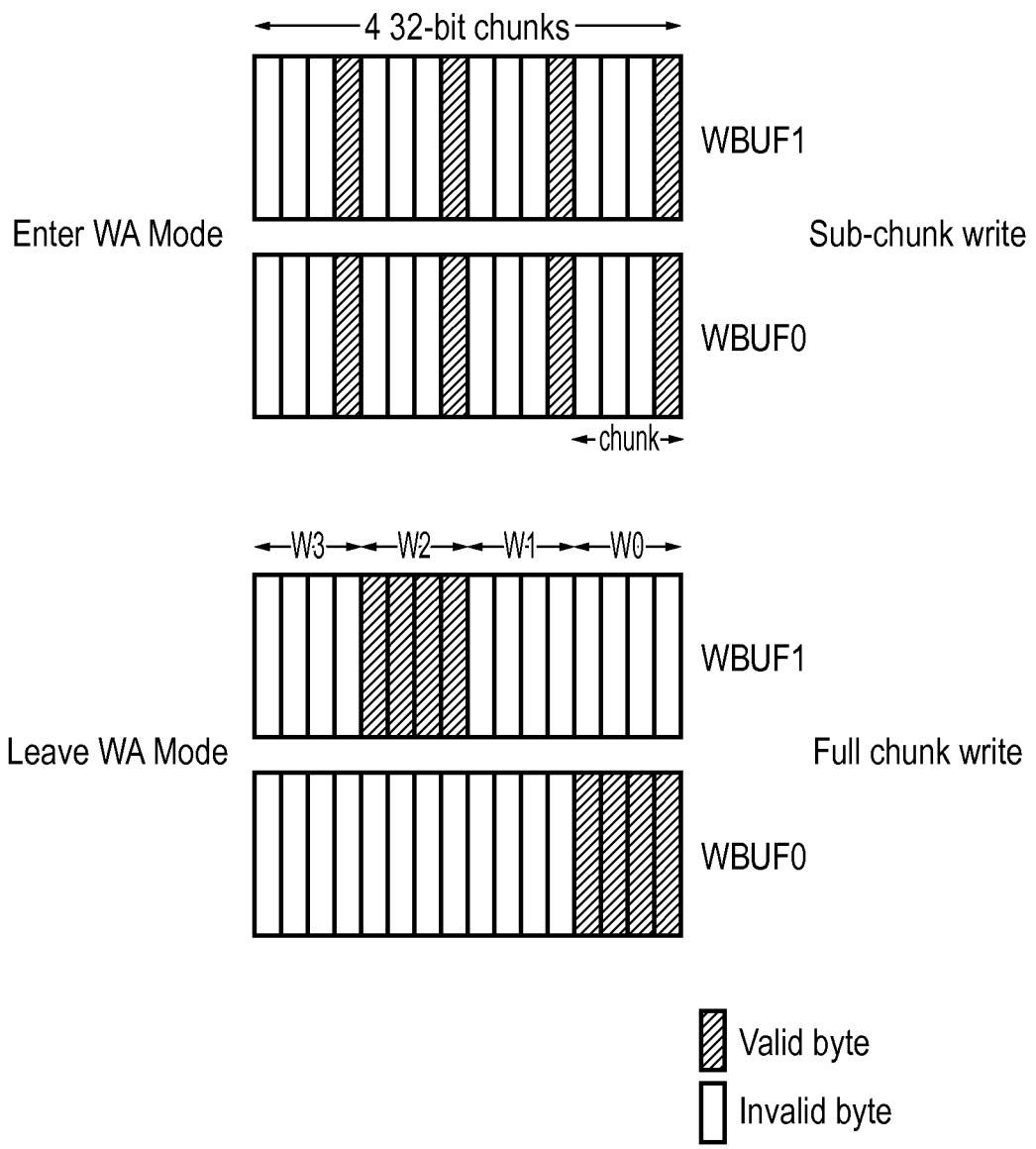
FIG. 3 schematically illustrates example content of a store buffer and the resulting change in cache allocation policy in one embodiment.

FIG. 3 schematically illustrates the content of two access slots of the store buffer 36, corresponding to two situations in which the control unit 46 of the store buffer 36 causes the cache unit 38 to change its allocation policy. The upper part of FIG. 3 schematically illustrates the situation where the two access slots (WBUF0 and WBUF1) each individually comprise more than one sub-chunk write, indeed in the illustrated example each of the four 32-bit chunks which are available in each access slot is only populated by a single valid byte, corresponding to the single byte sub-chunk write which should be carried out for each chunk. Accordingly, the control unit 46 of the store buffer 36 will identify the access undersize condition for either access slot individually, or indeed for the memory transactions initiated by each access slot, assuming that these take place back-to-back. As a result, the control unit 46 causes the cache unit 38 to subsequently operate (if it is not already doing so) with a write allocation policy. FIG. 3 further illustrates the situation when the control unit 46 of the store buffer 36 causes the cache unit 38 to switch back from operating in accordance with a write allocate policy to operating with a no-write allocation policy. This occurs when the control unit 46 identifies that the memory transaction to be carried out on the basis of the content of an access slot only comprises full chunk writes, i.e. there are no sub-chunk writes to be performed. The lower part of FIG. 3 illustrates a full chunk write configuration of both access slot WBUF0 and WBUF1.

Figure 4B:
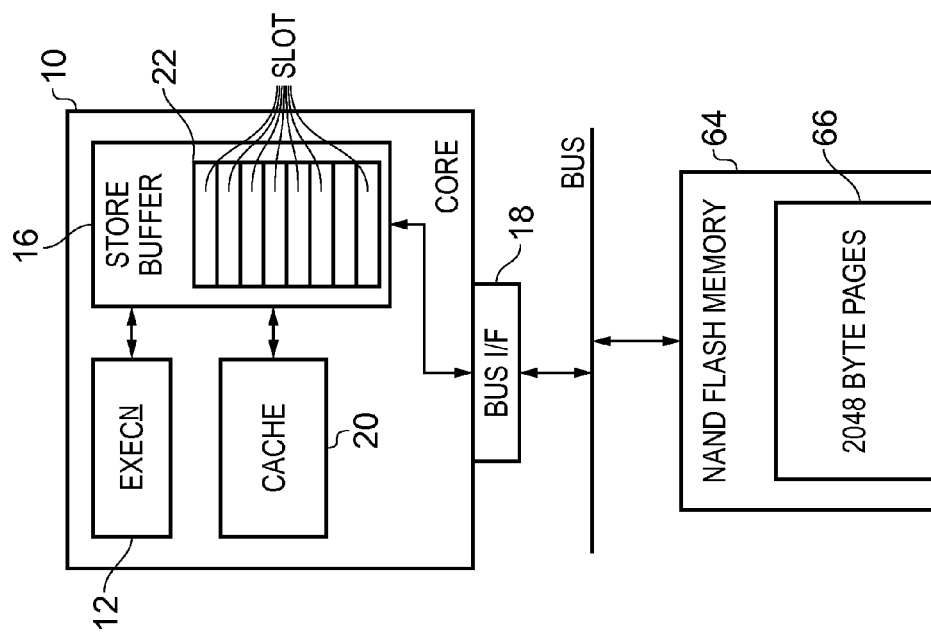
FIG. 4B schematically illustrates a data processing apparatus connected to a NAND flash memory in one embodiment.
Figure 4A:
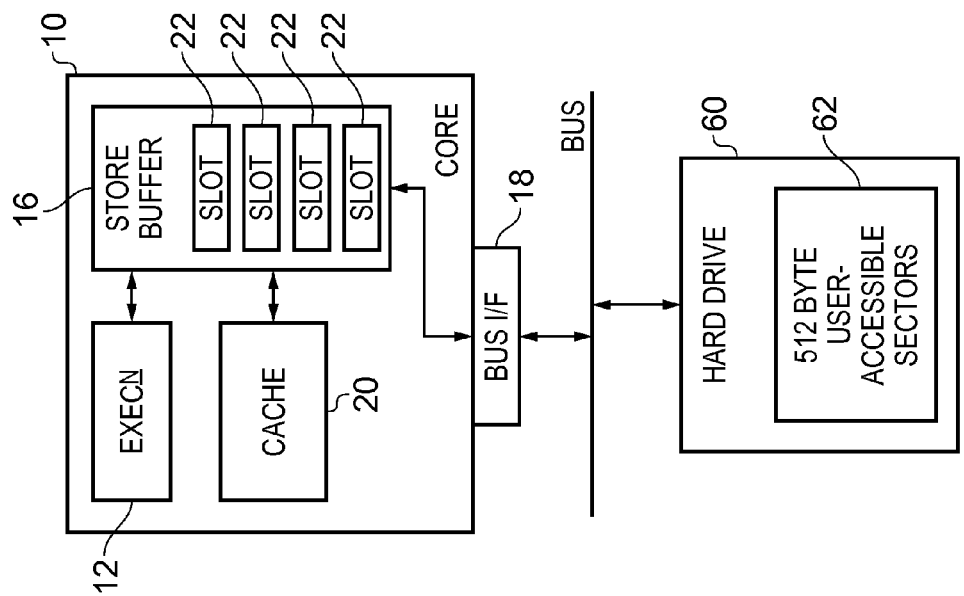
FIG. 4A schematically illustrates a data processing apparatus connected to a hard drive memory in one embodiment.

In the above described embodiment the constraint that a write transaction to the memory must take place with respect to a 4-byte chunk of data is due to the ECC stored in association with each 32-bit chunk in the memory 44. However, it is important to appreciate that the present techniques are in no way limited to such ECC-based configurations and the constraint that a write transaction initiated from an access slot of the store buffer must take place with respect to a block of data items (i.e. a group having corresponding memory addresses spanning more than one individual addressable memory location) could result from a variety of system configuration features. FIGS. 4A and 4B schematically illustrate two data processing systems where this is the case. In the example shown in FIG. 4A the data processing apparatus 10 (and therefore configured as described above with respect to FIG. 1) accesses a memory which is embodied as hard drive 60. The configuration of this hard drive 60 is such that access requests received by the hard drive 60 are constrained to access data in sectors 62 of 512 bytes, meaning that if a write access request is issued by execution unit 12 relating to less than a 512-byte sector, a "full" 512-byte write operation will nevertheless have to be carried out. Similarly, FIG. 4B schematically illustrates another example, in this instance where the memory access by the data processing apparatus 10 is to a NAND flash memory 64, in which the constraint exists that data must be written in 2048-byte pages 66.

Figure 5A:
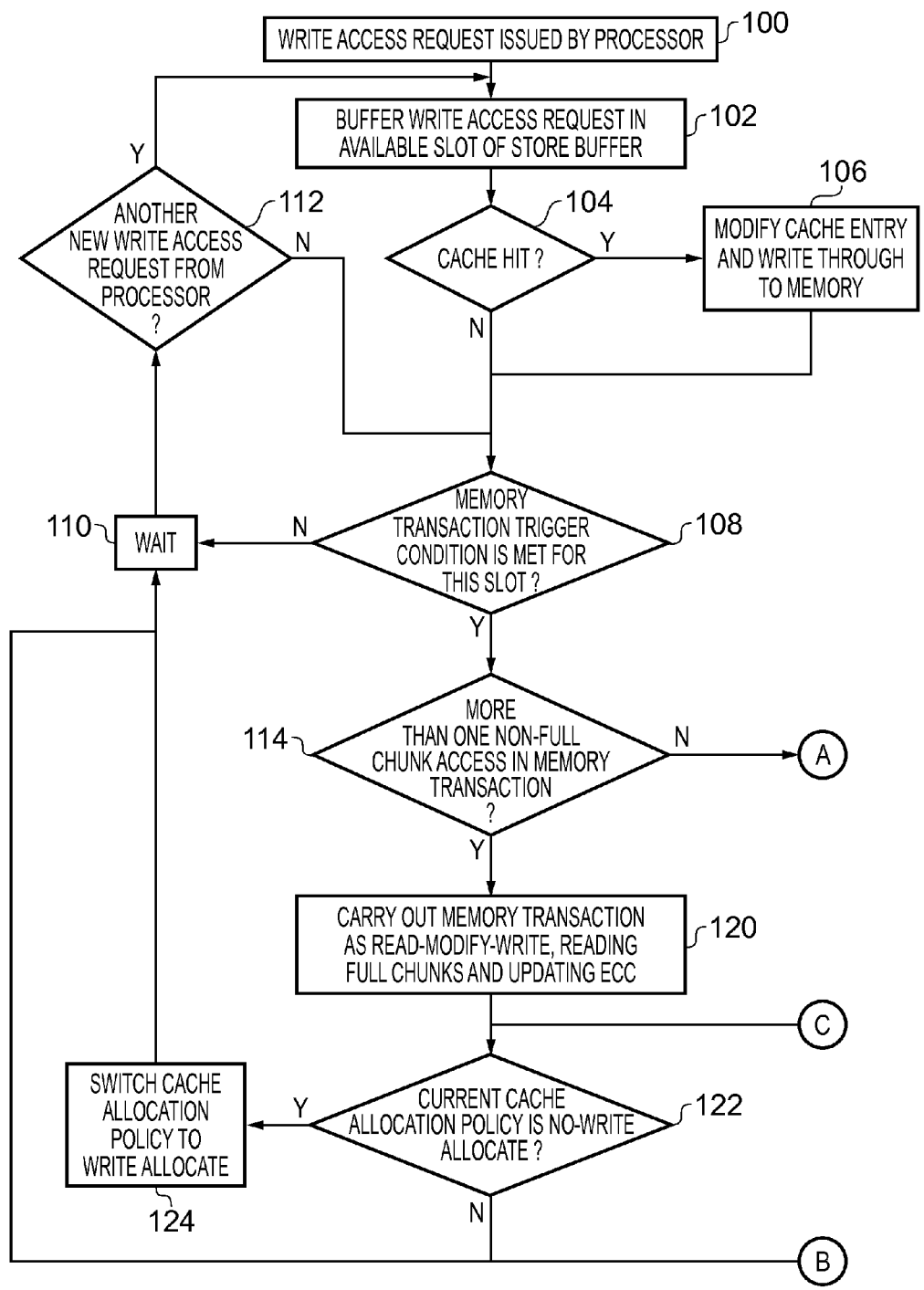
FIGS. 5A and 5B schematically illustrate a sequence of steps which are taken in the method of one embodiment.
Figure 5B:
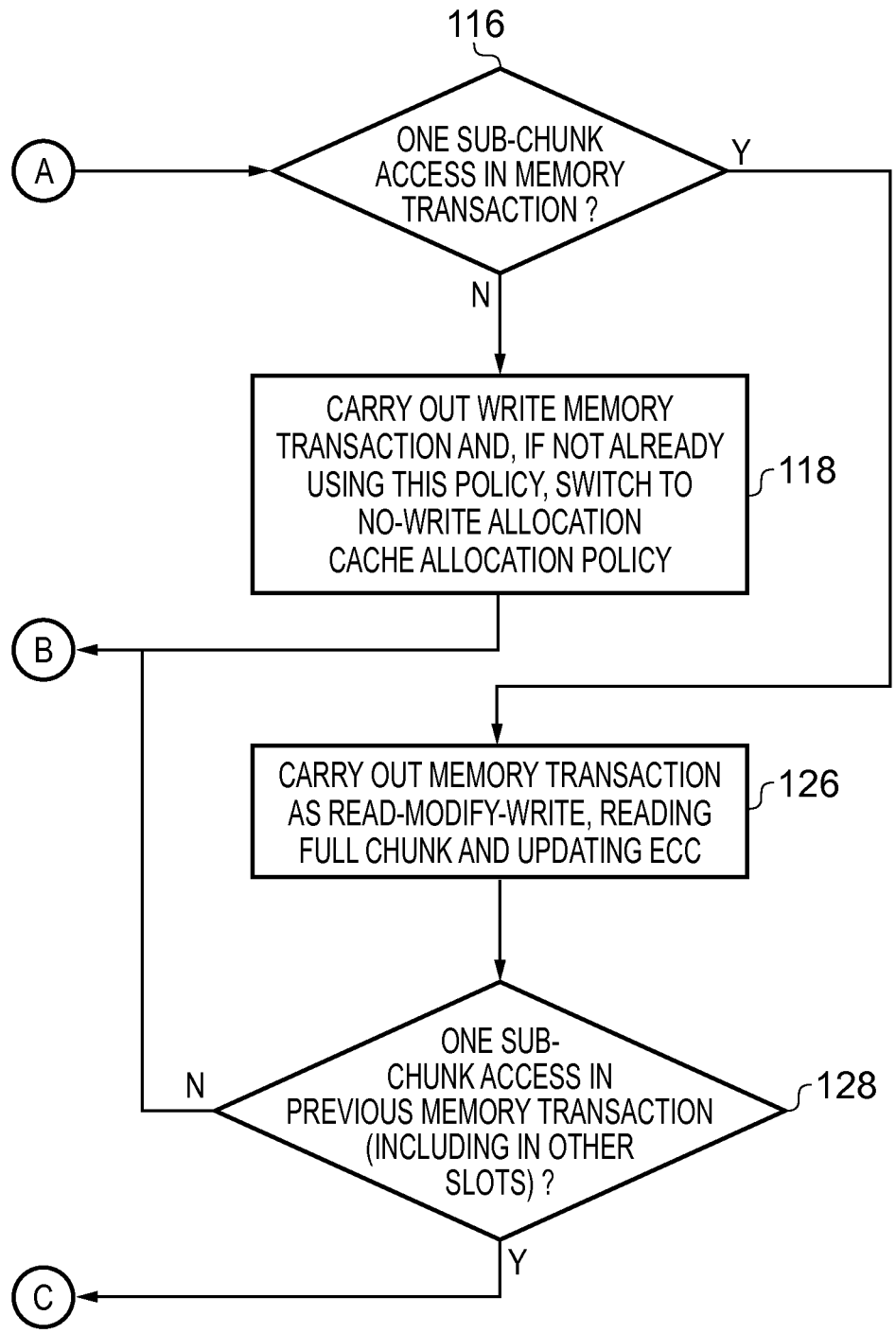

FIGS. 5A and 5B schematically illustrate a sequence of steps which are taken within a data processing apparatus according to the method of one embodiment. At step 100 a write access request, seeking to write a specified data item to a specified memory address, is issued by the processor. This write access request is received by the store buffer and is then temporarily buffered in an available access slot of the store buffer at step 102. The store buffer causes a cache lookup procedure to be initiated and at step 104 it is determined if a cache hit has occurred. If it has, then the flow proceeds via step 106 where the cache entry containing the specified data item is modified and the store buffer continues to handle the write access request in order to write through this modification to the memory. Thereafter, or if a cache miss occurs at step 104, at step 108 it is determined if the memory transaction trigger condition is met for this access slot. In other words, the store buffer determines if this access slot should be drained. It will be recognised by one of ordinary skill in the art that this condition could be met for a number of reasons, with which one of ordinary skill in the art is familiar and further description is dispensed with here for brevity. If the memory transaction trigger condition is not met then the flow proceeds to step 110 where the store buffer waits and at step 112 it is determined if another new write access request has been received from the processor. Whilst such a new write access request is not received, and the memory transaction trigger condition is not met, the flow circulates around the step 108, step 110, step 112 loop. If another new write access request from the processor is received then the flow proceeds to step 102 where this new write access request is buffered in an available slot of the store buffer. In particular, where the new write access request relates to a memory address which is sufficiently close to an already buffered write access request in the store buffer, then the new write access request will be buffered in the same access slot at an appropriate offset from the previously received write access request(s) stored in that access slot.

Once it is determined, at step 108, that the memory transaction trigger condition has been met for an access slot, then at step 114 it is determined if the memory transaction comprises more than one non-full-chunk access. If it does not, then flow proceeds to step 116 where it is determined if there is just one sub-chunk access in the required memory transaction. If there is not, i.e. if the required memory transaction only comprises full chunk write accesses, then at step 118 the write memory transaction is carried out and the cache unit is caused (if not already operating according to this policy) to switch to a no-write allocation policy. Thereafter the flow returns to step 110 and new write access requests from the processor are handled as described above.

Returning to step 114, if it is determined here that there is more than one non-full-chunk access in the memory transaction then at step 120 the required memory transaction is carried out as a read-modify-write operation according to which the full data chunks which comprise the more than one non-full-chunk specified are first read from the memory, the specified data items in the buffered write access requests are merged into the full chunks of data retrieved from the memory and the ECC associated with these four chunks are updated, and the thus-modified full data chunks are written back to the memory. Thereafter, at step 122 it is determined if the current cache allocation policy is no-write allocate. This being the case then at step 124 the cache unit is caused to switch allocation policy to write allocate and the flow proceeds via step 110 as described above. Alternatively, if at step 122 it is determined that the cache allocation policy is not no-write allocate (i.e. it is already write allocate) then the flow proceeds directly to step 110.

Now returning to step 116, if it is determined that there is just one sub-chunk access specified in the memory transaction then the flow proceeds to step 126 where the memory transaction is carried out as a read-modify-write operation according to which the full chunk corresponding to the one specified sub-chunk is first read from memory, the specified data item is merged into the full chunk and the corresponding ECC for the full chunk is determined, and the thus-modified full chunk is written back to the memory. Thereafter at step 128 it is determined if there was (at least) one sub-chunk access in the previous memory transaction carried out by the store buffer, including those initiated by other access slots. If this is not the case then the flow proceeds directly to step 110. If however, this is the case, then the flow proceeds via step 122 and potentially step 124 as described above in order to switch the cache allocation to write allocate as required.

In overall summary, a data processing apparatus and method of processing data are disclosed according to which a processor unit is configured to issue write access requests for memory which are buffered and handled by a memory access buffer. A cache unit is configured, in dependence on an allocation policy defined for the cache unit, to cache accessed data items. Memory transactions are constrained to be carried out so that all of a predetermined range of memory addresses within which one or more memory addresses specified by the buffered write access requests lie must be written by the corresponding write operation. If the buffered write access requests do not comprise all memory addresses within at least two predetermined ranges of memory addresses, and the cache unit is configured to operate with a no-write allocate policy, the data processing apparatus is configured to cause the cache unit to subsequently operate with a write allocate policy.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
a processor configured to issue a write access request which specifies a memory address and a data item in order to cause the data item to be stored in a memory at the memory address;
a cache memory configured, in dependence on an allocation policy defined for the cache memory, to store a local copy of an accessed data item from the memory for subsequent access by the processor; and
a memory access buffer configured to buffer one or more write access requests issued by the processor until a memory transaction trigger condition is satisfied and then to cause a memory transaction with respect to the memory to be initiated which comprises carrying out the one or more buffered write access requests,
wherein the memory transaction is constrained to carry out a write operation in which all of a predetermined range of memory addresses within which one or more memory addresses specified by the one or more buffered write access requests lies are written by the write operation,
wherein the data processing apparatus is configured to identify an access undersize condition when the buffered write access requests do not comprise all memory addresses within at least two predetermined ranges of memory addresses, and
when the cache memory is configured to operate with the allocation policy as a no-write allocate policy according to which the local copy of the accessed data item is not stored in the cache memory and the access undersize condition is met, the data processing apparatus is configured to cause the cache memory to subsequently operate with the allocation policy as a write allocate policy according to which the local copy of the accessed data item is stored in the cache memory.

2. The data processing apparatus as claimed in claim 1, wherein the cache memory is configured to operate in a write-through mode according to which modification of the local copy of the accessed data item by the subsequent access also causes modification of a corresponding original data item in the memory.

3. The data processing apparatus as claimed in claim 1, wherein the memory access buffer is configured, when the one or more buffered write access requests for which the memory access transaction is to be carried out specify memory addresses in at least one predetermined range of memory addresses which do not comprise all memory addresses within the at least one predetermined range of memory addresses, to cause the memory access transaction to comprise retrieving at least one extended data item indicated by the at least one predetermined range of memory addresses, causing the one or more data items specified in the buffered write access requests to be merged into the retrieved at least one extended data item, and writing the modified at least one extended data item back to the memory.

4. The data processing apparatus as claimed in claim 1, wherein the data processing apparatus is configured, after causing the cache memory to subsequently operate with the allocation policy as the write allocate policy, and when the memory transaction trigger condition is satisfied, to identify an access full-size condition when the buffered write access requests for which a memory access transaction is to be carried out specify memory addresses which comprise all memory addresses in at least one predetermined range of memory addresses within which the specified memory addresses lie, and when the access full-size condition is met, the memory access buffer is configured to cause the cache memory to switch back to operation with the allocation policy as the no-write allocate policy.

5. The data processing apparatus as claimed in claim 1, wherein the cache memory is configured initially to operate with the allocation policy as the no-write allocate policy.

6. The data processing apparatus as claimed in claim 1, wherein data items are stored in the memory with associated error correction code and the predetermined range of memory addresses is determined by a unit data item size which must be read from the memory in order for the associated error correction code to be updated.

7. The data processing apparatus as claimed in claim 6, further comprising an error correction code determination circuitry configured to determine updated error correction code values for inclusion in the memory transaction.

8. The data processing apparatus as claimed in claim 7, wherein the memory access buffer comprises the error correction code determination circuitry.

9. The data processing apparatus as claimed in claim 1, wherein the predetermined range of memory addresses is determined by a unit data size for the memory transaction with respect to the memory.

10. The data processing apparatus as claimed in claim 1, wherein the memory access buffer comprises an access slot, wherein the access slot is configured to buffer write access requests issued by the processor with respect to a selected memory address stored in association with the access slot.

11. The data processing apparatus as claimed in claim 10, wherein the access slot is configured to have a size which is less than the cache line size.

12. The data processing apparatus as claimed in claim 1, wherein the memory access buffer comprises multiple access slots, wherein each access slot is configured to buffer write access requests issued by the processor with respect to a selected memory address stored in association with that access slot.

13. The data processing apparatus as claimed in claim 12, wherein the data processing apparatus is configured to identify the access undersize condition with respect to the multiple write access requests which are buffered in more than one access slot.

14. The data processing apparatus as claimed in claim 1, wherein the data processing apparatus is configured to identify the access undersize condition when the buffered write requests which do not comprise all memory addresses within at least two predetermined ranges of memory addresses are carried out in a single memory transaction.

15. The data processing apparatus as claimed in claim 12, wherein the memory access buffer is configured to identify the access undersize condition when the buffered write requests which do not comprise all memory addresses within at least two predetermined ranges of memory addresses are carried out in separate memory transactions which are carried out at less than a predetermined separation from one another.

16. The data processing apparatus as claimed in claim 15, wherein the separate memory transactions are carried out back-to-back with respect to one another.

17. The data processing apparatus as claimed in claim 1, wherein the memory access buffer is configured to identify the access undersize condition, and the memory access buffer is configured to cause the cache memory to change allocation policy in dependence on the access undersize condition.

18. A method of data processing comprising the steps of:
issuing a write access request which specifies a memory address and a data item in order to cause the data item to be stored in a memory at the memory address;
in dependence on an allocation policy, storing a local copy of an accessed data item from the memory for subsequent access;
buffering one or more write access requests that have been issued until a memory transaction trigger condition is satisfied and then causing a memory transaction with respect to the memory to be initiated which comprises carrying out the one or more buffered write access requests,
wherein the memory transaction is constrained to carry out a write operation in which all of a predetermined range of memory addresses within which one or more memory addresses specified by the one or more buffered write access requests lies are written by the write operation;
identifying an access undersize condition when the buffered write access requests do not comprise all memory addresses within at least two predetermined ranges of memory addresses; and
when the allocation policy is a no-write allocate policy according to which the local copy of the accessed data item is not stored and the access undersize condition is met, causing the allocation policy to change to a write allocate policy according to which the local copy of the accessed data item is stored.

19. A data processing apparatus comprising:
means for issuing a write access request which specifies a memory address and a data item in order to cause the data item to be stored in a memory at the memory address;
means for storing, in dependence on an allocation policy, a local copy of an accessed data item from the memory for subsequent access;
means for buffering one or more write access requests that have been issued by the means for issuing until a memory transaction trigger condition is satisfied and then causing a memory transaction with respect to the memory to be initiated which comprises carrying out the one or more buffered write access requests, wherein the memory transaction is constrained to carry out a write operation in which all of a predetermined range of memory addresses within which one or more memory addresses specified by the one or more buffered write access requests lies are written by the write operation;
means for identifying an access undersize condition when the buffered write access requests do not comprise all memory addresses within at least two predetermined ranges of memory addresses; and
means for, when the allocation policy is a no-write allocate policy according to which the local copy of the accessed data item is not stored and the access undersize condition is met, causing the allocation policy to change to a write allocate policy according to which the local copy of the accessed data item is stored.

* * * * *